(12) United States Patent
Krampert et al.

(10) Patent No.: US 11,454,792 B2
(45) Date of Patent: Sep. 27, 2022

(54) LIGHT MICROSCOPE AND METHOD FOR PROVIDING STRUCTURED ILLUMINATION LIGHT

(71) Applicants: Carl Zeiss Microscopy GmbH, Jena (DE); LioniX International B.V., Enschede (NL)

(72) Inventors: Gerhard Krampert, Pleasanton, CA (US); Kai Wicker, Jena (DE); Ralf Netz, Jena (DE); Ronald Dekker, Enschede (NL); Edwin Jan Klein, Enschede (NL); Douwe Harmen Geuzebroek, Enschede (NL)

(73) Assignees: Carl Zeiss Microscopy GmbH, Jena (DE); LioniX International B.V., Enschede (NL)

( * ) Notice: Subject to any disclaimer, the term of this patent is extended or adjusted under 35 U.S.C. 154(b) by 434 days.

(21) Appl. No.: 16/610,223

(22) PCT Filed: Apr. 24, 2018

(86) PCT No.: PCT/EP2018/060404
§ 371 (c)(1),
(2) Date: Nov. 1, 2019

(87) PCT Pub. No.: WO2018/202466
PCT Pub. Date: Nov. 8, 2018

(65) Prior Publication Data
US 2020/0064609 A1    Feb. 27, 2020

(30) Foreign Application Priority Data
May 5, 2017    (DE) .......................... 102017109645.0

(51) Int. Cl.
*G02B 21/00*    (2006.01)
*G02B 27/58*    (2006.01)
(Continued)

(52) U.S. Cl.
CPC ..... *G02B 21/0032* (2013.01); *G02B 21/0068* (2013.01); *G02B 27/58* (2013.01);
(Continued)

(58) Field of Classification Search
CPC ............ G02B 21/0032; G02B 21/0068; G02B 27/58; G02B 21/0076; G02B 21/367; G01N 21/6458
See application file for complete search history.

(56) References Cited

U.S. PATENT DOCUMENTS 5,998,790 A * 12/1999 Downing .............. H01J 37/224
                                                                  250/397
2001/0042837 A1* 11/2001 Hoffmann .......... G02B 21/0068
                                                                  359/237
(Continued)

FOREIGN PATENT DOCUMENTS

CN        104459971 A      3/2015
DE   102007047466 A1      4/2009
(Continued)

OTHER PUBLICATIONS

Chinese Application No. 201880028320.4, Office Action, dated Jul. 15, 2021, 15 pages, English translation.
(Continued)

*Primary Examiner* — William R Alexander
*Assistant Examiner* — Sharrief I Broome
(74) *Attorney, Agent, or Firm* — LaBatt, LLC (57) ABSTRACT

A light microscope comprises: a structuring optical unit comprising a waveguide chip for providing a structured illumination; an input selection device for variably directing light to one of several inputs of the waveguide chip; the waveguide chip further comprising a light guide path following each of the inputs; each light guide path divides into several path divisions; and each path division leads to one
(Continued)

output of the wave-guide chip. The outputs of the waveguide chip can be arranged at a pupil plane of the light microscope, and an exit direction of light from the outputs is transverse to a plane defined by the waveguide chip. A method for providing structured illumination light using the light microscope is also described.

20 Claims, 6 Drawing Sheets (51) Int. Cl.
G01N 21/64 (2006.01)
G02B 21/36 (2006.01)
(52) U.S. Cl.
CPC ...... G01N 21/6458 (2013.01); G02B 21/0076 (2013.01); G02B 21/367 (2013.01)

(56) References Cited

U.S. PATENT DOCUMENTS

| 2004/0240046 | A1 | 12/2004 | Tischer et al. | |
|---|---|---|---|---|
| 2007/0023686 | A1* | 2/2007 | Wolleschensky | G01N 21/6458 |
| | | | | 250/459.1 |
| 2010/0290060 | A1 | 11/2010 | Mohazzab et al. | |
| 2011/0182529 | A1 | 7/2011 | Kempe et al. | |
| 2011/0274391 | A1* | 11/2011 | Tan | G02B 6/2817 |
| | | | | 385/27 |
| 2012/0228475 | A1* | 9/2012 | Pang | G02B 21/367 |
| | | | | 359/566 |
| 2015/0248015 | A1* | 9/2015 | Schwedt | G02B 26/0816 |
| | | | | 359/371 |
| 2015/0253559 | A1 | 9/2015 | Kalkbrenner et al. | |

FOREIGN PATENT DOCUMENTS

| DE | 102008049878 | A1 | 4/2010 |
|---|---|---|---|
| DE | 102012020877 | A1 | 4/2014 |
| EP | 1557708 | A2 | 7/2005 |
| JP | 2009157084 | A | 7/2009 |
| WO | 2006009845 | A2 | 1/2006 |
| WO | 2010080159 | A1 | 7/2010 |
| WO | 2011072175 | A2 | 6/2011 |
| WO | 2012118530 | A1 | 9/2012 |
| WO | 2014040800 | A1 | 3/2014 |

OTHER PUBLICATIONS

Windecker, R., International Application No. PCT/EP2018/060404, International Search Report and Written Opinion, dated Aug. 8, 2018, 12 pages.
German Application No. 10 2017 109 645.0, Search Report, dated Nov. 2, 2017, 12 pages (no English Translation available).

* cited by examiner

LIGHT MICROSCOPE AND METHOD FOR PROVIDING STRUCTURED ILLUMINATION LIGHT

TECHNICAL FIELD

The present disclosure relates to a light microscope having the features of the preamble to claim 1. The light microscope is configured to convert light from a light source into a structured illumination.

The present disclosure also relates to a method for providing structured illumination light, with the features of the preamble to claim 17.

BACKGROUND ART

Structured illumination microscopy (SIM) is an established technique to examine a specimen with a particularly high resolution. A structured illumination may, in general, be regarded as any distribution of light that is inhomogeneous over a cross section. For example, a structured illumination may comprise one or more lines, a grating pattern or merely a spot with an uneven intensity profile. These patterns are produced in a specimen plane.

If several images using different structured illumination patterns are recorded, it is possible to calculate one image with enhanced resolution from these images. Typically, nine or more images (referred to as raw images or a frame) are recorded, from which one high resolution image is calculated. These raw images differ in the rotational orientation of the structured illumination, and a phase shift in the structured illumination. The enhanced resolution may be higher than a diffraction limit or Abbe limit for the wavelengths used. It is generally expedient if the different structured illumination patterns are similar but rotated relative to each other.

In the context of this disclosure, structured illumination is not limited to the established SIM technique but can also be used for related techniques such as Synthetic Aperture Imaging, which may use a different pattern of structured illumination for examining a sample.

In many conventional approaches, a structured element is arranged in an intermediate image plane. The structured element may, for instance, be a grating. This grating pattern is thus imaged into the specimen plane. For recording different images, the structured element may be rotated. Alternatively an image rotator may be introduced in the beam path and/or may be rotated. It is also possible to produce differently orientated patterns in the specimen plane by using several different structured elements, which are alternatingly introduced into the beam path. These approaches involve rotations or other movements of rather large and heavy components, such as the structured element or an image rotator. Such movements constitute serious constraints in speed.

An advantageous solution to decrease time demand in recording several images is described by the applicant in DE 10 2007 047 466 A1 and in DE 10 2012 020 877 A1. Each of these applications describes an optical assembly in which a structured illumination is not produced by arranging a structured element in an intermediate image plane. Instead, a dot light pattern or spot pattern is produced in a focal plane. Said pattern in the focal plane leads, via a Fourier transformation, to a different, structured pattern in the specimen plane. Hence, a dot light pattern can lead to a stripe or grid pattern as would be produced with a grating in an intermediate image plane.

In DE 10 2007 047 466 A1 the different dot patterns are produced with optical fibers which lead light via microlenses or further optical elements into the pupil plane. Depending on which optical fibers are illuminated, different spot patterns in the pupil plane can be produced.

A generic light microscope, as described in DE 10 2012 020 877 A1, comprises:
a structuring optical unit for providing a structured illumination from impinging light, the structuring optical unit comprising a waveguide chip with a plurality of inputs;
an input selection device for variably directing light to one of the inputs;
the waveguide chip further comprising a light guide path following each of the inputs; each light guide path divides into several path divisions; and each path division leads to one output of the waveguide chip.

A generic method for providing structured illumination light in a light microscope comprises the steps of:
guiding light from a light source to an input selection device;
variably directing light with the input selection device to one of a plurality of inputs of a waveguide chip which is configured to provide structured illumination from incoming light;
the waveguide chip further comprising a light guide path following each of the inputs; each light guide path divides into several path divisions; and each path division leads to one output of the waveguide chip.

A generic light microscope thus does not use, as a structuring optical unit, a grating or other structured element in an intermediate image plane. Instead, a waveguide chip is used: Such a chip comprises a substrate, such as fused silica, in which light guide paths or path divisions are formed. A material of such paths has a different refractive index than the surrounding substrate. This may, for example, be achieved by doping the substrate at areas that shall form the paths.

With the input selection device, the different inputs can be illuminated one after the other. By dividing each light guide path into several path divisions, it is possible to send coherent light through several outputs (that belong to the same input) simultaneously. Distributing light from a path into the path divisions does not require any (moveable) switching elements in or at the waveguide chip. A path division may thus be defined as one of several paths in the waveguide chip connected to one light guide path. Light travelling in said light guide path will be spread into said several paths which are thus called path divisions.

DE 10 2012 020 877 A1 uses optical fibers connected to the outputs to lead light to a pupil plane. The optical fiber ends are arranged in the pupil plane in a desired dot pattern. This dot pattern translates to the desired structured illumination pattern in the image plane.

However, known techniques for producing spot patterns in a pupil plane require a demanding and cost-extensive setup: Using optical fibers with their ends arranged in the pupil plane poses high demands to positioning accuracy, with long-term stability being possible an issue. Furthermore, variations in the fiber lengths must be minimal due to the coherence length of the laser light.

SUMMARY OF THE INVENTION

It may thus be regarded as an object of the invention to provide a light microscope and a method for providing structured illumination light which offer a particularly good stability while also reducing complexity in the setup.

This object is solved with the light microscope comprising the features of claim 1, and the method comprising the features of claim 17. Variants of the light microscope and the method are indicated in the dependent claims and the following description.

According to the invention, the generic light microscope described above is characterized in that an exit direction of light from the outputs is transverse to a plane defined by the waveguide chip. This allows to form the outputs at exactly the positions desired for a certain spot pattern in or near a pupil plane. It is thus not necessary to rearrange a light pattern exiting the outputs: DE 10 2012 020 877 A1 suggests to use optical fibers following the outputs to direct light to a pupil plane and to rearrange a light pattern, i.e., the ends of the optical fibers (which do not face the waveguide chip) define the light pattern in the pupil plane. The present invention renders obsolete the use of such optical fibers and hence avoids all issues connected with correct alignment, accuracy and long term stability of such an optical fiber arrangement. Instead the present invention allows to position the waveguide chip such that its outputs are arranged at a pupil plane of the light microscope. A crucial feature is to couple-out light transversely to a plane defined by the waveguide chip. This plane may be considered to be spanned by the two longer sides of the waveguide chip, which may be referred as length and width, meaning that light is coupled out in a height direction of the waveguide chip. Alternatively, the plane may be defined as being spanned by the directions of the light guide paths and path divisions. The plane is preferably parallel to a pupil plane.

In other words, a coupling-out direction of light is transverse to a direction of the respective light guide path/path division, i.e., transverse to a plane spanned by these paths. In contrast to prior art designs in which light beams exit the waveguide chip at one of its smaller side faces, the invention provides for a waveguide chip at which light exits at the largest side, i.e., the plane defined above. The coupling-out or exit direction is transverse to this plane, which comprises any oblique angles and may in particular be perpendicular in which case the plane defined by the waveguide chip may be exactly in and parallel to the pupil plane. The light guide paths and the path divisions may as well extend in or parallel to a pupil plane of the light microscope. The oblique angles may be considered as being comprised of any angles between 0° and 80° to a normal of the plane, or any angles between 0° and 70° to the normal of the plane.

The generic method described above is characterized in that light exits the outputs in an exit direction which is transverse to a plane defined by the waveguide chip.

It may be preferable to arrange the outputs of the waveguide chip at or in the region of a pupil plane of the light microscope. Arranging the waveguide chip in the region of a pupil plane may be understood such that the pupil plane intersects the plane of the waveguide chip, or alternative such that a distance from the pupil plane to the waveguide chip is smaller than the maximum distance between light beams exiting the waveguide chip through its outputs.

In prior art solutions light is coupled out at a thin side of the waveguide chip, i.e., a side defined by the height and length, or defined by the height and width. In this way it is not possible to form the outputs in a suitable pattern for a pupil plane, thus requiring rearrangement by optical fibers or other optical elements.

An input of the waveguide chip may be considered as an area at which light is coupled into the chip. An optical fiber may lead light to the input. For each input, a respective optical fiber may be provided. Within the waveguide chip, each input abuts or is directly connected to a light guide path. The input may also be considered as an entrance surface of a light guide path at an outer side of the waveguide chip.

The input selection device may be any device able to variably guide light onto different beam paths which lead to the different inputs. The input selection device may in particular comprise a variable light deflector such as a scanner for directing light to one of the inputs. For example, the scanner may comprise one or more movable mirrors, such as galvanometer mirrors, or a micro electro-mechanical system (MEMS). A scanner offers substantial improvements in speed, as the scanner can be considerably faster than movements of larger components, such as moving a grating arranged in an intermediate image plane. The input selection device may also comprise different kind of light deflectors, for example one or more acoustically switchable devices, such as an acousto-optical deflector. In general, also variably blocking beam paths or deflecting light dependent on its polarization may be used for the input selection device.

Each output may be designed to reflect light out of the waveguide chip. To this end, each output may comprise an interface for deflecting light out of the waveguide chip by total internal reflection (TIR). The interface may be regarded as an outer surface section of the waveguide chip and may also be referred as a TIR mirror. A substrate of the waveguide chip may be shaped such that a suitable angle relative to a path division is formed to provide for total internal reflection. The interface may be formed by a recess or groove in the substrate. The recess may be produced by a focused ion beam or another lithographic process, described in greater detail further below.

Alternatively, each output may comprise an interface for deflecting light out of the waveguide chip, wherein the interface comprises a mirror. In this case a respective recess may be formed in the substrate at each path divisions, and this recess is provided with a mirror to reflect light from the respective path division out of the waveguide chip. The interface/mirror may be formed such that light is not directly reflected out of the waveguide chip but instead first transverses the substrate and exits the waveguide chip on a side opposite the interface/mirror.

Each interface, i.e., the surface at which light from the path divisions is reflected, may be formed at an angle between 20° and 70°, or between 40° and 50° to the plane of the waveguide chip. This ensures a substantially perpendicular coupling-out or exit direction relative to said plane or at least an angle to a normal of the waveguide chip plane which is sufficiently small so that light exiting the waveguide chip does not miss a subsequent lens or other optical component.

Instead of using one reflective surface (interface) for redirecting a light beam from a path division into the exit direction, the path divisions may also have a bent shape. The bent shape may form a curve of 90°, or more generally between 80° and 100°. Also in this way a coupling-out direction is substantially perpendicular to the plane spanned by the light guide paths/the waveguide chip. As an advantage, there are less additional manufacturing steps for achieving the coupling-out direction, in comparison to the above embodiments. However, the dimensions of the waveguide chip need to be sufficiently large to allow for the bent or curved shape.

To form the outputs in a desired pattern, it may be necessary to form the path divisions such that at least some path divisions which belong to different inputs or the same input intersect. It may be preferable that some or all of the intersecting path divisions intersect each other at an angle between 80° and 130° or at an angle of 90° or larger than 90° or 95°. As it cannot be completely avoided that a small fraction of light crosses at an intersection from a first path division into a second path division, the angle larger 90° ensures that light is rather scattered into the backward direction in the second path division and not in the forward direction in the second path division; the forward direction indicating the direction towards the respective output.

Intersections can alternatively be avoided if path divisions are formed in three dimensions, i.e., in different height layers. It is possible to produce such light guide paths and path divisions with, for example, two photon absorption laser inscribing, which alters the absorbing material/substrate such that its refractive index changes.

The outputs that belong to the same input form a dot or spot pattern. This dot pattern in the pupil plane translates to a structured pattern, such as stripes, in the specimen plane. The waveguide chip may comprise three or more inputs which each have their respective outputs forming a respective dot pattern. These dot patterns may be similar/identical to each other but rotated relative to each other. In this way structured illumination microscopy with an enhanced resolution in all directions can be produced. The dot patterns may be identical to each other if rotated about a common central point, which may correspond to the optical axis of the microscope. The central point may coincide with a geometrical center of the dot patterns.

The dots of each dot pattern may geometrically correspond to diffraction orders of a grating arranged in an intermediate image plane. A central dot corresponds to the zeroth diffraction order. Two other dots which are directly opposite each other relative to the central dot correspond to the first and minus first diffraction orders. A dot pattern may be constituted of these three dots, or only the dots corresponding to the first and minus first diffraction orders, or may comprise additional dots corresponding to further diffraction orders. It may be preferable that the dots corresponding to the first and minus first diffraction orders have a higher intensity than the central dot which corresponds to the zeroth diffraction order.

A splitter divides each light guide path into two or more path divisions. Two or more consecutive splitters may be provided to produce the desired dot pattern. A splitter may be formed as a widening area that leads to the path divisions; light from the light guide path is hence widened and distributed into the path divisions. The intensities in the individual path divisions may vary from each other, in particular as described above for a dot corresponding to the zeroth diffraction order compared with the other dots corresponding to other diffraction orders. An important characteristic is the wavelength dependency: A path division should provide a desired intensity distribution independent from the wavelength of the light. However, the longer the wavelength, the higher is the intensity share directed to outer path divisions at a splitter. Furthermore, the efficiency of coupling-in light at a splitter into a path division is lower for outer path divisions. Hence, these two effects can partially compensate each other and reduce the wavelength dependency. For this compensation to be particularly effective, it is advantageous if each light guide path is connected to a splitter formed in the waveguide chip which is configured to divide the light guide path into four parts, and wherein three of said parts constitute three path divisions, and one of said parts leads light away such that light of that part does not illuminate a sample. Such a design allows two path divisions to have the same intensity, and one path division to have a lower intensity, with a reduced wavelength dependency. The forth part, which is not used to illuminate a sample, may direct light against a wall or any absorber, or in another direction than the outputs described above.

The path division that is not used to illuminate a sample may guide light to a photodetector. Signals from the photodetector may in particular be used for checking the coupling-in of light at the inputs of the waveguide chip.

Alternatively, the path division that is not used to illuminate a sample is connected to an interferometer with a phase shifter, e.g., a Mach Zehnder interferometer, which are integrated in the waveguide chip. Said phase shifter may be controlled identically to the other phase shifters in the waveguide chip, e.g., a common phase shifter setting such as a certain temperature change may be set with all phase shifters. The interferometer measures the phase shift caused by this phase shifter setting. A measurement value of the interferometer therefore allows to verify and adjust a setting of the phase shifters to achieve a desired phase shift.

Light from a dot pattern, i.e. from the outputs that belong to the same input, forms an interference pattern in the specimen plane. In this regard the polarization direction of the light is important. A dot pattern may comprise three or more dots in one line, which may in particular correspond to the minus first, zeroth, and first diffraction orders of a grating in an intermediate image plane. Preferably, light is linearly polarized with a direction perpendicular to the line in which the dots of one dot pattern are arranged.

However, the efficiency of the splitters may be best if the polarization of impinging light is within the plane that is spanned by the light guide paths.

It may therefore be preferred to provide for a polarizing unit (also referred to as input polarizing unit) upstream of the waveguide chip which ensures that light impinging on the inputs and thus on the splitters has a desired polarization, in particular transverse magnetic modes with a polarization direction of the electric field within the plane spanned by the light guide paths. However, in principle, also a transverse electric mode may be used instead. For transverse magnetic modes it may be preferred that the polarization direction after the splitters is rotated by 90°, or more generally: rotated by an angle between 70° and 110°. To this end, a polarizing unit (also referred to as an output polarizing unit) may be used on which light from the path divisions or outputs impinges. The output polarizing unit is configured to rotate a polarization direction of impinging light by the angle mentioned above.

The output polarizing unit may in particular comprise two half-wave plates arranged in series and rotated relative to each other by 45°. In this way the polarization direction is rotated by 90° independent from the former orientation of the polarization.

A half-wave plate or lambda/2 plate is a retarder that rotates the polarization direction of impinging linearly polarized light. The angle of rotation depends on the orientation of the half-wave plate. The orientation (in the following referred to as rotation axis) may be defined by the fast axis of a crystal that forms the half-wave plate. The angle of 45° between the half-wave plates indicates that the fast axes of the two half-wave plates are at an angle of 45° to each other. The plates as such are parallel to each other, however, rotated by 45°.

The half-wave plates described above are arranged such that light from all outputs impinge on these plates. In contrast, it is also possible to use polarization affecting means individually for each output. For example, at each output, one respective half-wave plate may be attached to the substrate. That means the number of half-wave plates may correspond to the number of outputs. The half-wave plates that belong to outputs of the same input may have the same orientation (of their fast axes), and a different orientation to those half-wave plates that belong to outputs of another input. With such local half-wave plates, light from each output only needs to pass one and not two half-wave plates for setting a desired polarization direction. As a main advantage of this embodiment, all necessary means for polarization rotation are already included on one waveguide chip. This considerably reduces the number of movable components that need adjustment and leads to a reduced overall size which may be essential in applications where space is at a premium.

A similar effect may be achieved if each output comprises a first mirror and a second mirror arranged at a substrate of the waveguide chip, and the mirrors are configured such that they rotate a polarization direction of impinging light, preferably by 90°. The mirror pair may be arranged to form a micro-periscope: The first mirror may redirect light within the plane of the waveguide chip. The second mirror may then redirect light out of said plane, in particularly in a perpendicular direction to this plane. The second mirror has thus two functions: coupling-out impinging light and rotating its polarization direction.

The light microscope may also be designed to provide a TIR (total internal reflection) illumination. In a TIR illumination, a light beam impinges under a very acute angle on a specimen surface (or a cover glass surface at the specimen); the angle being such that the light beam is totally reflected at the surface. Fluorophores in the sample can be excited by an evanescent wave of the TIR illumination beam. In a pupil plane, such a light beam for TIR illumination is located at an outer area, further distanced from the optical axis. For providing a TIR illumination, the waveguide chip comprises one or more additional inputs which each connect to an additional light guide path leading to a respective additional output (which is here referred as a TIR output). The outputs provided for structured illumination define a geometric center, and each TIR output is further away from the geometric center than any of the outputs of the structured illumination.

In addition or alternatively, light beams from the outputs described above may also be used for TIR illumination in the following way: A zoom assembly may be arranged behind the outputs, i.e., between the outputs and the specimen plane. A control unit is provided and designed to receive a control command indicating whether a structured illumination is desired or a total internal reflection illumination is desired. The control unit is further designed to set a larger magnification with the zoom assembly if total internal reflection illumination is desired. In a pupil plane the larger magnification means that a light spot is further away from a central or optical axis. The zoom assembly may also be referred to as a zoom lens; it may comprise several individual lenses or mirrors.

The spot patterns described above comprise several dots in one line. Such patterns are suited for the well-establish SIM technique. Related microscopy techniques may require other spot patterns. The waveguide chip may thus have outputs (that belong to the same input) arranged in other patterns than a straight line, in addition or as an alternative to the spot pattern outputs described above. In particular, such other spot patterns may be preferred for the technique of Synthetic Aperture Imaging.

Structured Illumination Microscopy requires recording several (raw) images of a specimen with a different phase of the structured illumination. These raw images with different phases are then used to calculate one image with increased resolution. In general, one or more phase shifters may be arranged behind the waveguide chip. For example, near an intermediate image plane the phase shifter may be a phase shifting wave plate which may be moved with a galvanometer-driven scanner to shift the structured illumination pattern on the sample; alternatively, if phase shifters are arranged near a pupil plane, the phase shifters may be configured to shift a light phase individually for each diffraction order. However, such setups require rather high instrumental efforts. It may therefore be preferred to substitute such phase shifters by adjustable phase shifters in or at the waveguide chip. These integrated adjustable phase shifters may be connected to or arranged next to the path divisions for adjustably setting a phase shift of light travelling through the respective path division. Such phase shifters are configured to affect light propagation in the respective path division, e.g., by varying a temperature, stress, pressure, deformation or position of the path division. Some or all of the path divisions may be provided with a respective phase shifter. In one example, a splitter splits a light guide path into three path divisions, wherein two path divisions correspond to the first and minus first diffraction orders, and receive a larger light intensity than the other path division, which corresponds to the zeroth diffraction order. In particular in this case only the two path divisions that receive a larger light intensity than the remaining path division may be equipped with an adjustable phase shifter. An adjustable phase shifter may for example be a thermo-electric phase shifter. It may be attached at the substrate next to a path division and be configured to produce a temperature change at or in the respective path division, which in turn affects light travelling therein and changes its phase.

Alternatively or additionally, piezo-electric phase shifters may be used. A piezo-electric phase shifter may comprise crystals or other elements, e.g., piezo-electric thin films such as aluminum nitride and lead zirconate titanate, attached to a top and bottom side of the substrate of the waveguide chip, respectively, next to one of the path divisions. The piezo-electric phase shifter is able to apply stress on the substrate and the path division between the crystals. This affects light propagation and the phase of light travelling through this path division. Piezo-electric phase shifters may be particularly fast compared with other phase shifters.

The invention further comprises a method for fabricating a light microscope as described in this disclosure. The method comprises in particular processing the substrate of the waveguide chip to form the light guide paths, the path divisions, and the recesses at which the interfaces for reflecting light are formed. Accuracy in forming these elements is of paramount importance. In a preferred variant of the method, some or all of these elements are formed by a focused ion beam (FIB). The beam may affect the substrate such that its refractive index is changed, forming the light guide paths and the path divisions. In particular with higher intensity, FIB can be used to remove substrate material with high accuracy, forming the recesses and possibly the interface for total internal reflection.

As an alternative to FIB, two-photon polymerization may be used in which case a light beam is directed onto the substrate or more specifically into a hole in the substrate filled with e.g. a monomer which is affected in case that two photons are jointly absorbed. In a further step, a chemical development or etching allows to remove areas that are not affected by two photon absorption (or depending on the substrate: the areas that are affected by two photon absorption).

In general, other lithographic processes may be used in which a layer on the substrate is irradiated using a mask, and subsequently irradiated or non-irradiated areas are removed, e.g. by etching. However, such lithographic processes may not offer the required accuracy which is achieved with FIB or possibly with two-photon absorption techniques.

For FIB, it is preferred to produce target markers on the substrate which then help in steering the focused ion beam onto desired areas. For instance, target markers may be used next to an areas in which a recess with a TIR surface is to be produced. The target markers remain on the substrate after FIB processing.

The light microscope may also comprise a light source and optical elements arranged for directing light from the light source via the scanner to the waveguide chip. The microscope may further comprise optical elements arranged between the waveguide chip and a specimen plane, which optical elements are configured to create a pupil plane at a location of the waveguide chip, and to produce in the specimen plane an interference pattern of the light exiting through the outputs, for providing a structured illumination in the specimen plane.

Features described with respect to the light microscope may also be regarded as variants of the inventive methods; and vice versa.

Any values indicated in this description, e.g. values of angles, may be considered as exactly the indicated value, or in alternative embodiments as comprising a range of values within 10% or 20% deviation of the indicated value. Similarly, the terms "parallel" and "perpendicular" may be considered to comprise angle ranges of −10° to +10° and 80° to 100°, respectively.

BRIEF DESCRIPTION OF THE DRAWINGS

Further features and characteristics of the invention will be described with respect to the attached figures.

Similar components are provided with identical reference signs throughout the figures.

DETAILED DESCRIPTION OF THE INVENTION

Figure 1:
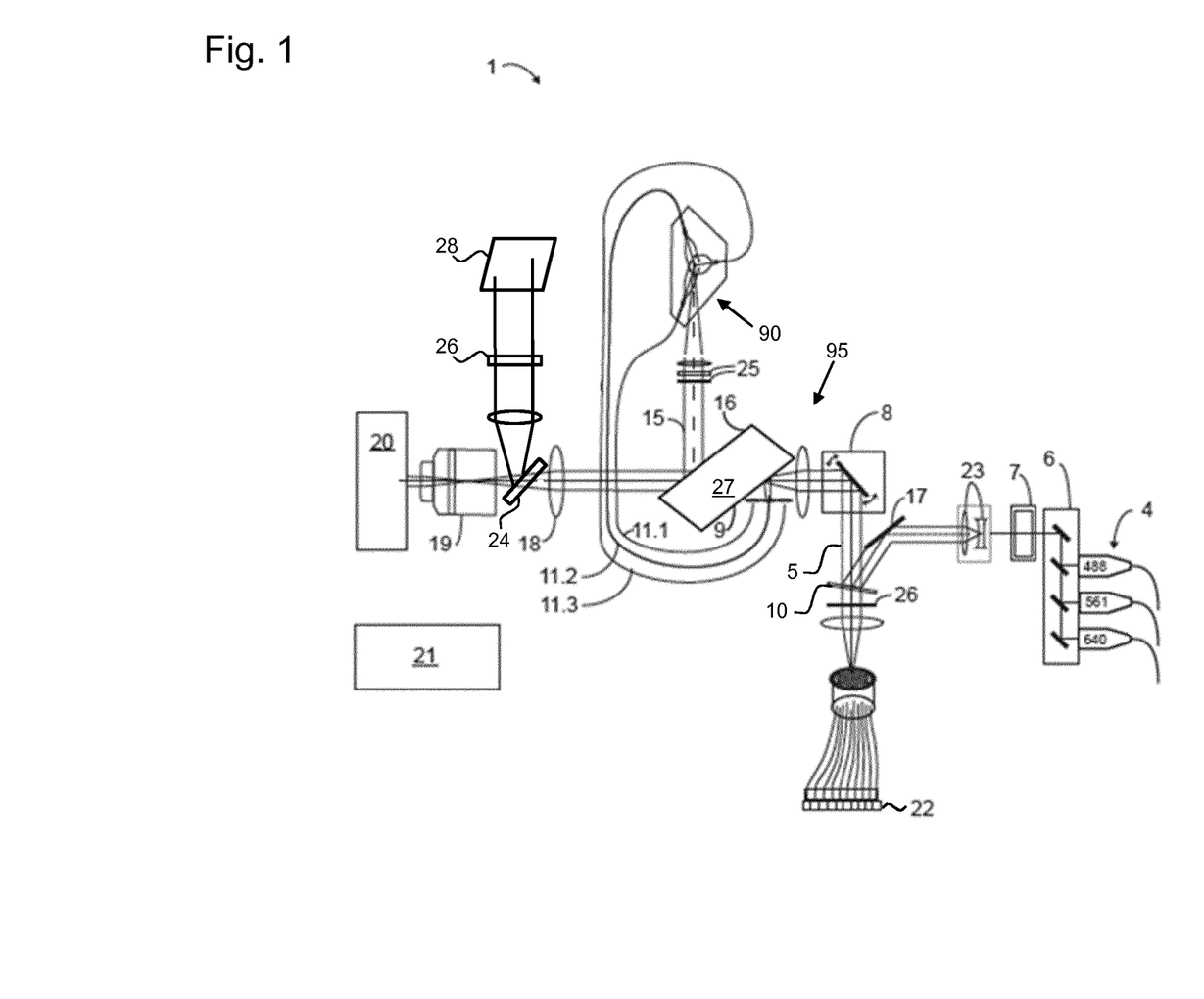
FIG. 1 schematically shows an embodiment of a light microscope with an optical assembly according to the invention.

FIG. 1 shows schematically an embodiment of an inventive light microscope 1 which comprises an optical assembly 95.

The microscope 1 comprises a light source 4 which emits light 5 that can be guided via an input selection device 8 to different inputs of a waveguide chip 90 of the optical assembly 95. The waveguide chip 90 provides for structuring of the light such that light exiting the waveguide chip 90 is suitable for structured illumination microscopy (SIM), a superresolution microscopy technique. The input selection device 8 may also be regarded as part of the optical assembly 95.

In the depicted example the input selection device 8 is formed as a scanner 8 with a rotatable mirror. However, in the following description the scanner 8 may also be replaced by other variants of an input selection device described elsewhere in this disclosure.

The light source 4 may comprise, as indicated in FIG. 1, several lasers. Between the light source 4 and the scanner 8, a plurality of optical components is optionally provided: Following the light source 4, several partially transparent mirrors 6 may be used for combining the beam paths of all lasers on a common beam path. Furthermore, an acousto-optical tunable filter (AOTF) 7 and lenses 23 or a beam expander 23 may optionally be provided.

The scanner 8 is configured to variably deflect impinging light 5 in different directions. To this end the scanner 8 may comprise one or more rotatable mirrors or other movable optical elements. These allow fast switching times. A fast scanner 8 may also be realized by varying a refraction index of a medium by acoustic waves transmitted through the medium.

Light 5 deflected by the scanner 8 can be guided to the waveguide chip 90. Depending on the deflection direction of the scanner 8, different inputs of the waveguide chip 90 can be selected. FIG. 1 shows as an optional design several optical fibers 11.1, 11.2, and 11.3 which guide light from the scanner 8 to the different inputs of the waveguide chip 90.

The design of the waveguide chip 90 is described in greater detail further below. Each input of the waveguide chip 90 leads to several outputs arranged in a spot pattern. Light entering one input thus exits the waveguide chip 90 in a spot pattern. The spot pattern consists of coherent light beam bundles. These are thus suitable to interfere in a specimen plane 20, creating an interference pattern used as structured illumination. As each input of the waveguide chip 90 is connected to different outputs, it is possible to choose between different spot patterns.

As an important characteristic of the invention, the outputs of the waveguide chip 90 are arranged in a pupil plane. Hence, a spot pattern in the pupil plane leads to a structured pattern of, e.g., stripes in the specimen plane 20. Different spot patterns in the pupil plane lead to different structured patterns in the specimen plane, as required for structured illumination microscopy.

Structured light 15 exiting the waveguide chip 90 is guided to the specimen plane 20 via several optical components, which may include an optical element 18 such as a tube lens or a zoom assembly 18, and an objective 19, amongst others.

As shown in FIG. 1, the microscope 1 may also comprise a movable deflector 27 arranged between the scanner 8 and the optical waveguide chip 90. Depending on a position of the deflector 27, light is either directed to the waveguide chip 90 or is bypassed around the waveguide chip 90 directly to the specimen plane 20. In the position shown in FIG. 1, the movable deflector 27 is arranged such that it directs light 5 from the scanner 8 to the optical fibers 11.1, 11.2, 11.3 leading to the inputs of the waveguide chip 90. If the movable deflector 27 is moved out of the beam path, light 5 from the scanner 8 travels directly towards the optical element 18 or the objective 19.

The deflector 27 may comprise two reflecting surfaces 9 and 16 which are rigidly connected to each other. Reflecting surface 9 reflects light from the scanner 8 to one of the optical fibers 11.1, 11.2, 11.3. Reflecting surface 16 reflects light 15 from the outputs of the waveguide chip 90 towards optical element 18 and the objective 19.

Light coming from the sample is detected with a detector or camera 28. For example, between the objective 19 and the deflector 27, or between the deflector 27 and the outputs of the waveguide chip 90, a (dichroic) beam splitter 24 may be used for guiding light coming from the specimen to the detector/camera 28 (and not to the waveguide chip 90). A further detector 22 may be provided for a laser scanning operation in which the deflector 27 is arranged such that light 5 does not travel via the waveguide chip 90. In front of the detector 22 and the camera 28, lenses and filters 26 may optionally be used, respectively. In a laser scanning operation, illumination light and specimen light may share a common beam path through the objective 19 and may be separated with a partially reflective mirror 10, e.g., a dichroic beam splitter 10 which transmits or reflects light depending on the wavelength.

A control unit 21 may be configured to control the scanner 8, the detector 22, and/or movement of the movable deflector 27.

The microscope 1 may further comprise thermo-electric or piezo-electric phase shifters which are preferably integrated in the waveguide chip 90. The phase shifters adjustably shift a phase of light, which is required for recording several images with structured illumination of the same orientation but different phase. For example, the waveguide chip 90 may comprise a thermo-electric unit or electrical heating elements next to the path divisions, for varying the temperature of the path divisions. In this way the phase of light running through the individual path divisions can be varied.

Figure 2:
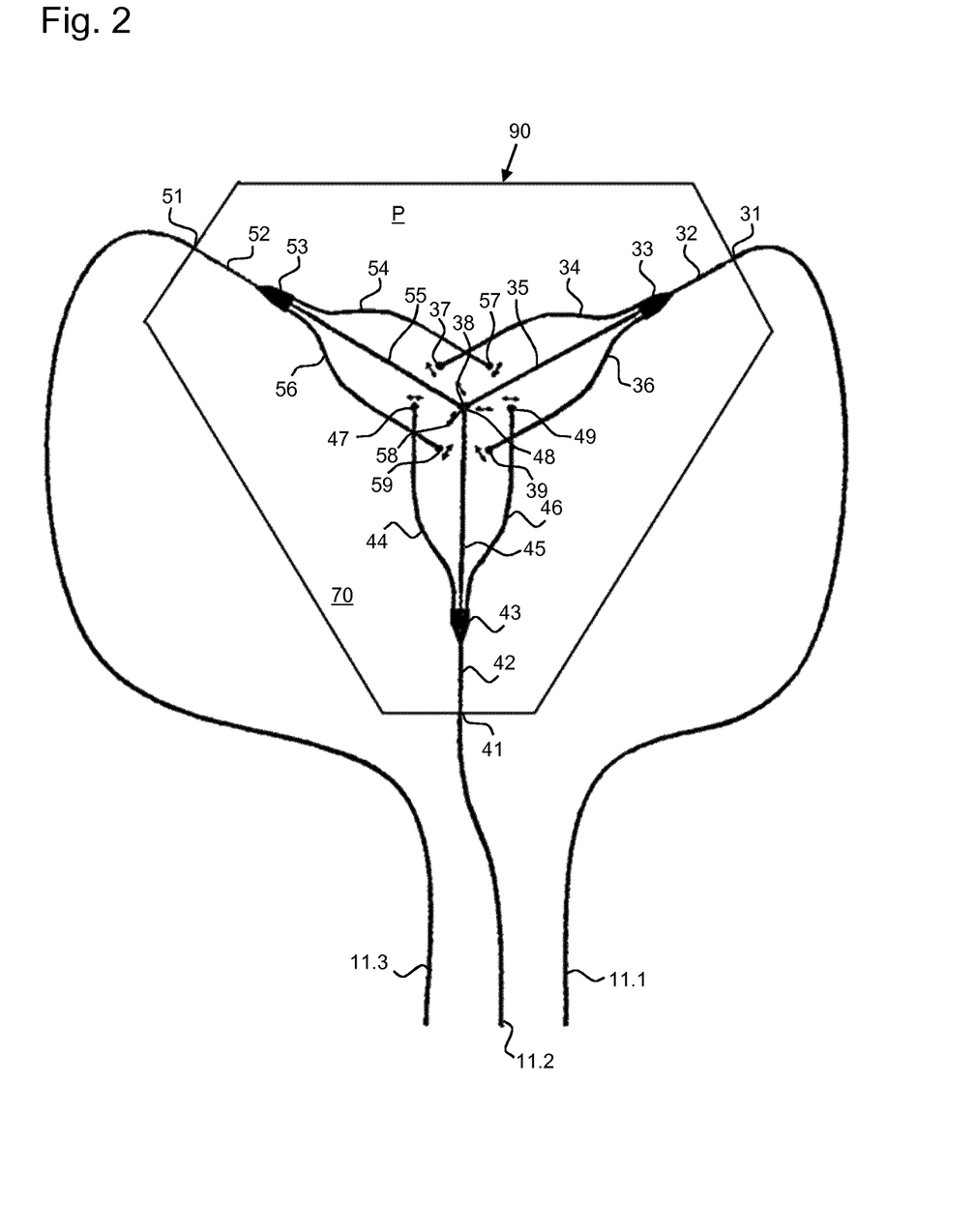
FIG. 2 schematically shows an embodiment of the optical assembly of FIG. 1.

Turning to FIG. 2, the design of an exemplary waveguide chip 90 is shown and will be further described.

The waveguide chip 90 comprises a substrate 70, which may be fused silica, for example. Within the substrate 70 paths are formed which have a different refractive index compared with the substrate 70. It is thus possible to guide light along these paths. The waveguide chip 90 comprises several inputs 31, 41, 51, which are each connected to a respective path, in the following referred to as light guide paths 32, 42, 52. Optical fibers 11.1, 11.2, 11.3 may be used to direct light to the different inputs 31, 41, 51. Depending on a state of the scanner 8, it is thus possible to selectively illuminate one of the inputs 31, 41, 51. The optical fibers may be omitted if the scanner is arranged such that it directs light directly onto one of the inputs 31, 41, 51.

Each light guide path 32, 42, 52 leads to a respective splitter 33, 43, 53, which splits the light guide path 32, 42, 52 into several parts, referred to as path divisions 34-36, 44-46, 54-56. Each path division leads to a respective output 37-39, 47-49, 57-59, where light exits the waveguide chip 90.

In the depicted example, there is a first, second, and third input 31, 41, 51. The outputs 37-39 connected with the first input 31 form a first spot pattern; the outputs 47-49 connected with the second input 41 form a second spot pattern; and the outputs 57-59 connected with the third input 51 form a third spot pattern.

The waveguide chip 90 defines a plane P which is arranged in and parallel to a pupil plane. In other words, the (main) directions of the light guide paths 32, 42, 52 span a plane P that is parallel to the pupil plane, and arranged in the region of or in the pupil plane. All outputs 37-39, 47-49, 57-59 are thus also arranged in the region of or in the pupil plane.

A spot pattern in the pupil plane corresponds spatially to the beam bundles of different diffraction orders of a grating arranged in an intermediate image plane. In prior art setups, such a grating is used for providing structured illumination. Light diffracted at a grating forms several beam parts corresponding to different diffractions orders. The diffraction orders comprise in particular a zeroth diffraction order which is a central beam part, and a minus first and first diffraction orders. In a pupil plane these zeroth, minus first, and first diffraction orders may form three dots along one line. The outputs 37-39, 47-49, 57-59 are now arranged to produce such a spot pattern in the pupil plane. For easier understanding, reference is in the following made only to the outputs 37-39. A central output 38 is arranged at a center point which may be at or in the region of an optical axis of the light microscope. This central output 38 provides a light spot corresponding to a zeroth diffraction order of a grating in an intermediate image plane. The other two outputs 37, 39 are arranged opposite each other with respect to the central output 38, and correspond to the minus first and first diffraction orders, respectively.

Light parts from these outputs 37-39 interfere in the specimen plane. For a particularly good contrast in such an interference pattern, the relative light intensities of the outputs 37-39 are important. Preferably the splitter 33 is designed such that the intensity in the central output 38 is lower than in the other outputs 37, 39. For example, the intensity in the central output 38 may be between 2% and 25%, or between 8% and 20% of the light intensity reaching the splitter 33. The remaining light intensity is distributed in equal parts to the two other outputs 37, 39.

The description above to the outputs 37-39 and the components connected thereto also applies to the outputs 47-49, and 57-59.

These groups of outputs 37-39, 47-49, and 57-59 differ in the arrangement of their spot patterns. Each spot pattern may be formed by spots in a line; however, the lines of different groups of outputs 37-39, 47-49, and 57-59 are rotated relative to each other. In other words, each input 31, 41, 51 is connected with a central output 38, 48, 58; these are formed next to each other in a central region corresponding to an optical axis of the microscope. The remaining outputs 37, 39, 47, 49, 57, 59 are arranged on a circular band around said central region. As the central outputs 38, 48, 58 are merely next to each other and cannot be at exactly the same position, the remaining outputs 37, 39, 47, 49, 57, 59 are preferably not arranged on an exact circle but rather a circular band in which the outputs 37 and 39 have the same distance to the output 38, and similarly the outputs 47 and 49 have the same distance to the output 48, and the outputs 57 and 59 have the same distance to the output 58.

Different spot patterns that are rotated relative to each other correspond to structured patterns in the specimen plane that are rotated relative to each other, as required for structured illumination microscopy.

A crucial feature of the waveguide chip 90 described above resides in that all outputs are arranged in a common plane P which is in or at a pupil plane. This is achieved by coupling-out light from the waveguide chip 90 at an angle relative to the directions of the light guide paths 32, 42, 52. The angle may in principle have any values that differ from zero; wherein it may be preferred that the angle to the plane P is approximately 90° (i.e., parallel to a normal of the plane P) or more generally between 20° and 90°.

This is further explained with reference to FIG. 3, which schematically shows a detail of the waveguide chip 90 of FIG. 2. FIG. 2 is a cross-sectional view of the waveguide chip 90, and hence this view is perpendicular to the view of FIG. 2.

Figure 3:
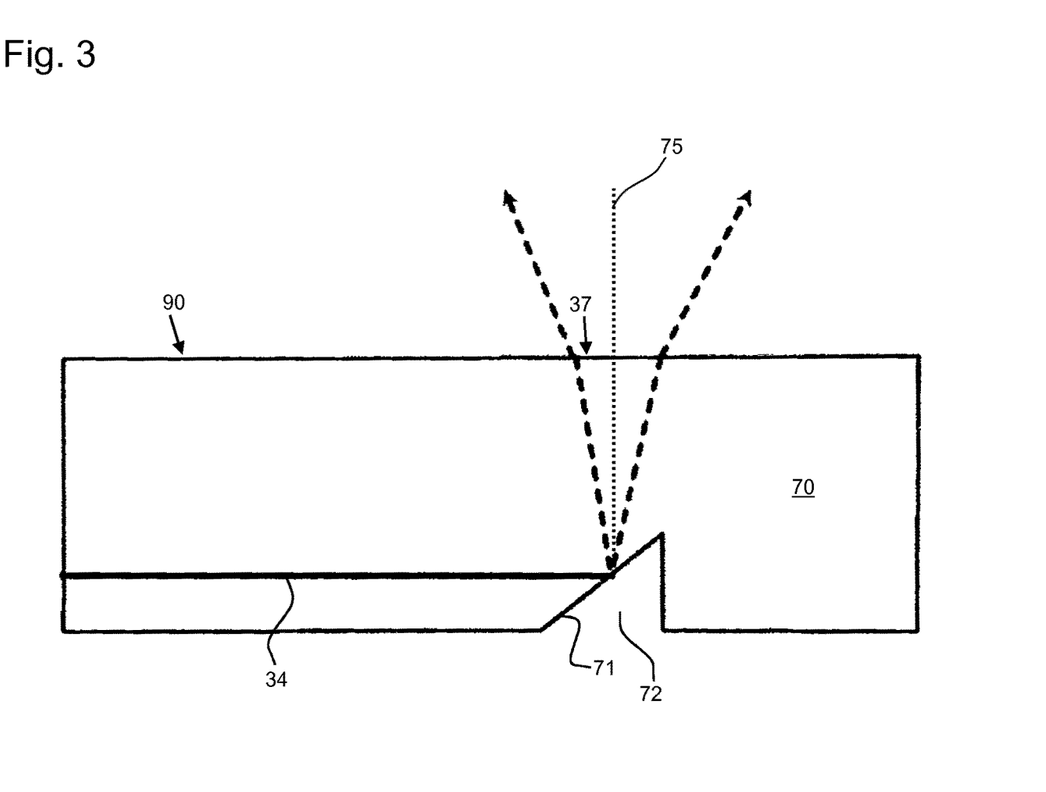
FIG. 3 schematically shows an exemplary design of a part of the optical assembly of FIG. 1 or 2.

FIG. 3 shows the substrate 70 in which the path division 34 is formed. The path division 34 leads to the output 37. For redirecting and coupling-out light, a recess 72 is provided in the substrate 70. The recess 72 may be regarded as part of the output 37 and forms a surface 71 or interface 71 which abuts the path division 34. Light from the path division 34 is thus deflected at the interface 71. In the depicted example, the surface 71 is at such an angle relative to the path division 34 that light is reflected within the waveguide chip 90 by total internal reflection. Reflected light thus passes through the waveguide chip 90 and exits the waveguide chip 90 at a side opposite the recess 72 and opposite the interface 71. A reflection angle at the interface 71 is approximately 90°. FIG. 3 shows in dashed lines a fanned light beam, wherein a central dotted line 75 of the fanned light beam indicates an exit direction 75 of light. The exit direction is at an angle of 90° to the plane of the waveguide chip; this plane extends along the path division 34 and into the paper plane of FIG. 3. A region at which light reflected from the interface 71 exits the waveguide chip 90 is referred to as an output 37. Such a region may simply be an interface between the substrate 70 and a surrounding medium, typically air.

The surface 71 may also be referred to as a TIR (total internal reflection) micro mirror. If the surface 71 is an interface between air and the substrate/the respective path division, an evanescent light field penetrates the air. For typically used light wavelengths this evanescent field may be, for example, about 100 nanometers. Due to interaction with air molecules, the evanescent field may lead to a deterioration of the surface 71. To avoid such drawbacks, the surface 71 may be coated (e.g., with a metal or dichroidically coated) to avoid interaction of an evanescent field with air. Alternatively, the recess 72 may be provided with a cover and filled with a protective gas such as Argon. The surface 71 then contacts the protective gas which does not interact with the evanescent field.

Instead of total internal reflection, it is also possible to use a mirror at the surface 71.

In other variants of the invention, the surface/interface 71 may be formed at another angle to cause an exit direction varying from 90°.

The reflecting interface 71 is formed on one side of the substrate such that reflected light travels through the substrate before exiting the waveguide chip 90 on a side opposite the interface 71. After reflection at interface 71, a light beam widens and hence exits the waveguide chip 90 with a larger cross-section compared with a case in which the light beam would exit the waveguide chip 90 at the interface 71, without previous transversal of the substrate. The larger cross-section means a reduction in peak intensity over the cross-section. This reduced peak intensity ensures that no damage occurs at the surface where the light exits the waveguide. Advantageously, no further elements (such as end caps used at optical fibers) are necessary for coupling-out light from the waveguide chip. Instead, light may simply leave through the substrate without any further elements being necessary.

The arrangement of the interface or mirror 71 such that reflected light is directed through the waveguide chip 90 has further advantages: Additional optical elements such as a microlens or a half-wave plate may be directly attached to the output (i.e., the location of the substrate where reflected light exits). Such a convenient arrangement and attachment of microlenses or other components would not be possible if light left the waveguide chip on the side of the interface/mirror 71.

The other path divisions and other outputs may be formed similarly to the one shown in FIG. 3.

While FIG. 2 shows an embodiment in which each splitter 33, 43, 53 splits incoming light intro three path divisions, other splitter design with additional path divisions are possible; the above description applies in those cases, wherein the additional outputs may be arranged on the same line as the three outputs described above, or alternatively in another pattern.

Figure 4:
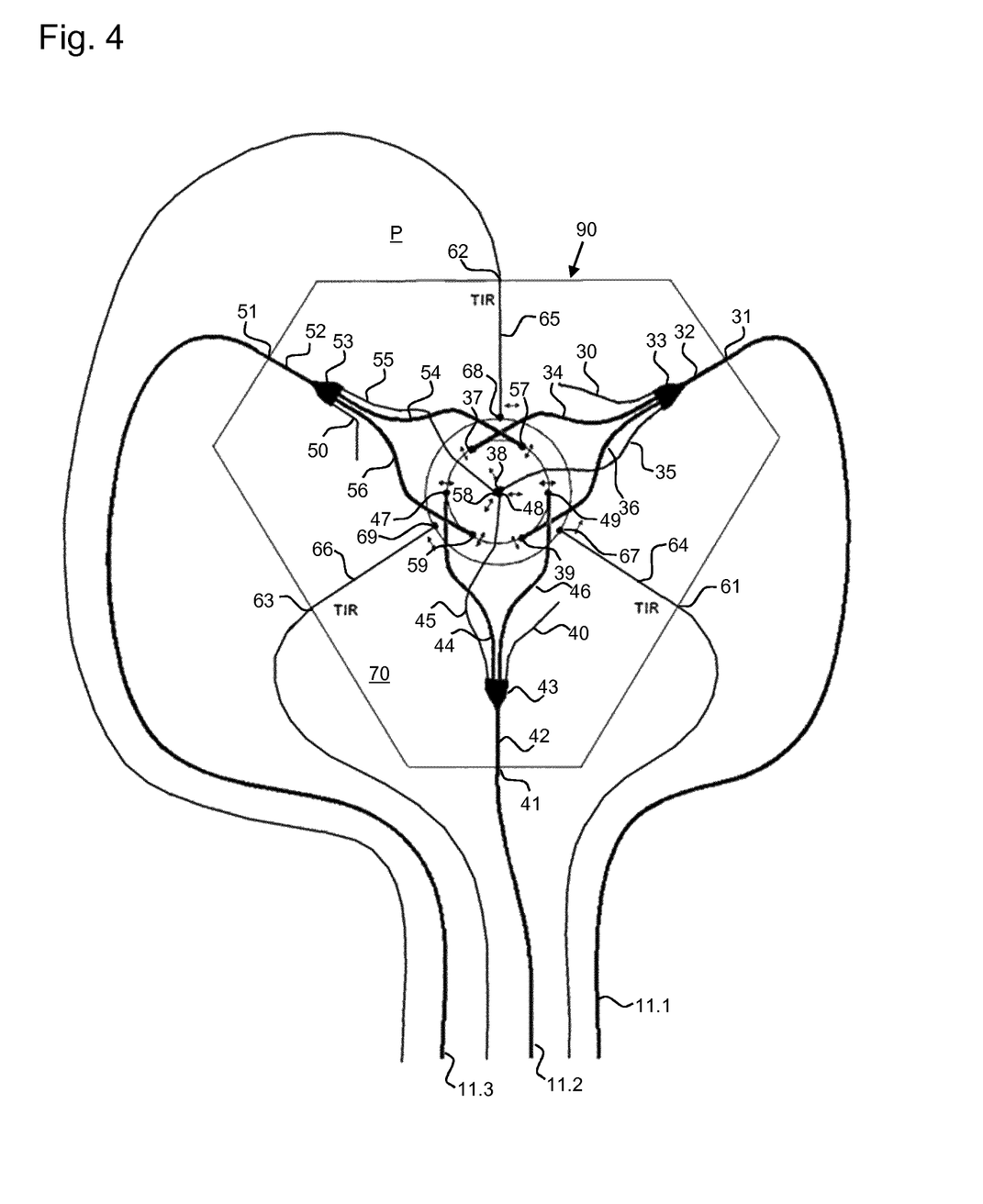
FIG. 4 schematically shows a further embodiment of an optical assembly of a light microscope according to the invention.

A further embodiment of a waveguide chip 90 of an inventive light microscope is shown in FIG. 4. This waveguide chip 90 may comprise all components shown in FIG. 2, with additional features in the design of the splitters 33, 43, 53, and additional inputs 62, 72, 82 for TIR illumination, i.e., illumination suitable for examining a specimen by total internal reflection of light at a specimen surface.

The features of the splitter design and the inputs for TIR illumination are independent from each other, and hence the optical assembly of FIG. 2 may additionally be provided with the splitter design of FIG. 4 and/or the features for the TIR illumination that will be described with reference to FIG. 4.

The splitters 33, 43, 53 used in FIG. 4 split light into four path divisions 30, 34-36; 40, 44-46; and 50, 54-56, respectively. For easier understanding, the following description refers to splitter 33 and its path divisions 30, 34-36. However, the other splitters 43, 53 and their path divisions may be formed similarly.

Only three of the four path divisions 34-36 lead to outputs as described with reference to FIG. 2. The respectively remaining path division 30 is not used to illuminate a sample. Instead, it may lead to an outer area further away from the optical axis and directs or scatters light to an absorber, e.g., a casing of the optical assembly. Each splitter 33 is built such that two of its path divisions 34, 36 receive an equal amount of light intensity which is higher than the light intensity in the other two path divisions 30, 35. These path divisions 30, 35 may again receive the same intensity. The path divisions 34, 36 may be centrally arranged in the splitter 33 whereas the other two path divisions 30, 35 are further outside in the splitter 33. Such a design with an unused path division (i.e., a path division not used to illuminate the sample) offers advantages in that the intensity distribution among the path divisions depends less on a wavelength of the light. This is further explained in the general description of this invention.

The remaining path division 30 which is not used to illuminate a sample may be used for other purposes. It may guide light to a photodetector, e.g., by leading to an outer area of the pupil plane, and from there coupling-out light to a photodetector. Signals from the photodetector may be used to monitor and control the coupling-in of light at the inputs of the waveguide chip. For example, depending on a signal from the photodetector, an element connected with the input (e.g., a position of an optical fiber leading to this input) may be adjusted.

Alternatively, the remaining path division 30 which is not used to illuminate a sample is connected to an interferometer with a phase shifter, e.g., a Mach-Zehnder-Interferometer. The phase shifter and preferably the interferometer are integrated in the waveguide chip. The phase shifter may be controlled identically to the other phase shifters in the waveguide chip, e.g., a common temperature change may be induced in all phase shifters. The interferometer measures the phase shift caused by this temperature change. Thus, a measurement value of the interferometer allows to correct a control of the phase shifters to achieve a desired phase shift. This may be implemented in a closed-loop (feedback) control.

In further embodiments, a remaining path division 30 which is not used to illuminate a sample is connected with a light source. For example, an LED may be fixed on the waveguide chip at an end region of the path division 30. Light from the light source travels through path division 30 towards splitter 33. The light further propagates from splitter 33 through light guide path 32 and leaves the waveguide chip at input 31. After traveling through optical fiber 11.1, the light can be measured with, e.g., a photo detector, and can be used for beam adjustment or collimation adjustments.

Other remaining path divisions 40, 50 not used for illuminating a sample may be similarly or alternatively provided with a light source and used as described above for path division 30.

Instead of four path divisions, another even number may be used, wherein in each case one path division is not used to illuminate the sample.

If one of the outer path divisions 35 receives a lower intensity, this path division should lead to a central portion corresponding to a zeroth diffraction order of a grating in an intermediate image plane. This may require intersecting or crossing another path division 36.

Furthermore, path divisions 36, 46 of different splitters 33, 43 may intersect each other. Preferably, an angle of intersection (defined for the sections of the path divisions 36, 46 that run from the intersection to their respective outputs) is between 80 and 120°, or preferably equal or larger 90°. In this way crosstalk between the path divisions 36, 46 is low. An angle larger 90° means that a fraction of light from path division 36 that enters path division 46 is more likely to run backwards and not towards the output of path division 46; and hence does not or hardly affect the generated spot pattern. As described elsewhere in this disclosure, such intersections can be avoided with a 3D design of light guide paths or path divisions. In such a design the light guide paths or path divisions are not limited to a plane but also extend in a direction transverse to this plane.

The waveguide chip 90 of FIG. 4 further comprises additional inputs 61-63 used for TIR illumination, which are thus also referred to as TIR inputs 61-63. Each TIR input 61-63 is connected to a respective TIR output 67-69 via a respective light guide path 64-66. In the pupil plane, the TIR outputs 67-69 are arranged further outside (i.e., further distanced from an optical axis) than the outputs 37-39, 47-49, 57-59 for structured illumination.

A respective optical fiber may lead to each of the TIR inputs 61-63 such that the scanner 8 is able to select either one of the inputs 31, 41, 51, 61, 62, 63.

While FIG. 4 shows an embodiment with three TIR inputs 61-63, this design may be generalized to one or more TIR inputs.

The efficiency of each splitter depends on the polarization of incoming light. Preferably, the light is linearly polarized in a direction in which the splitting occurs (as indicated with arrows in FIGS. 2 and 4). However, SIM requires a polarization that is preferably perpendicular to this orientation. It is therefore preferred to rotate the polarization of light behind the splitters.

Figure 5:
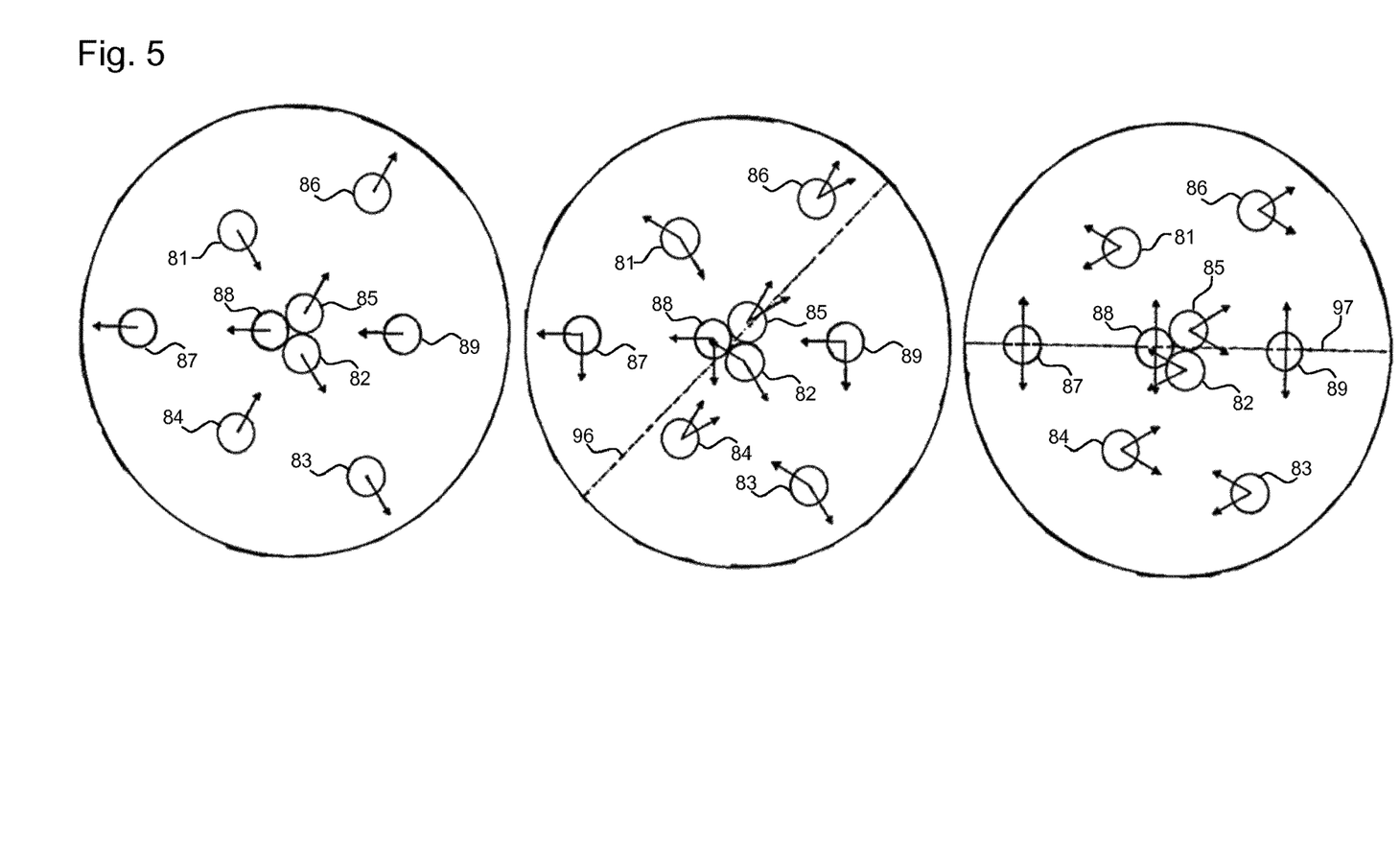
FIG. 5 schematically shows the positions and polarization directions of light beams at or behind the waveguide chip of the inventive light microscope.

This is further described with reference to FIG. 5, which shows in the left part the three spot patterns. A first spot pattern comprises light spots 81, 82, 83 in a pupil plane corresponding to the outputs 37-39. A second spot pattern comprises light spots 84-86 corresponding to the outputs 47-49. Finally, a third spot pattern comprises light spots 87-89 corresponding to the outputs 57-59.

The polarization direction for each light spot 81-89 is indicated with an arrow.

Two half-wave plates may be used for rotating the polarization direction in each case by 90°. Such half-wave plates 25 are shown in FIG. 1 between the waveguide chip 90 and the specimen plane 20. Preferably the half-wave plates 25 are arranged directly at the outputs of the waveguide chip 90. In this way, smaller cross-sections of the plates 25 suffice. The half-wave plates 25 are preferably achromatic. The polarizations of the light spots 81-89 before and after passing through the first half-wave plate are shown in the middle section of FIG. 5 with arrows. This middle section also indicates the orientation of the fast axis 96 of the first half-wave plate. Note that only the angle between the axes of the two half-wave plates is important but not their absolute orientation. The right part of FIG. 5 shows the polarization directions of the light spots 81-89 before and after passing through the second half-wave plate. Indicated is also the fast axis 97 of the second half-wave plate. As shown in the right part of FIG. 5, the polarization direction for each light spot is rotated by 90° and is now perpendicular to a line connecting the spots 81-83 of the same spot pattern.

One or both of the half-wave plates may also be substituted by other means that achieve a polarization rotation of 90°. Turning to FIG. 3, the surface of the substrate at each output 37 may be provided with or processed to have a structure acting as a half-wave plate, thus replacing one half-wave plate.

Figure 6:
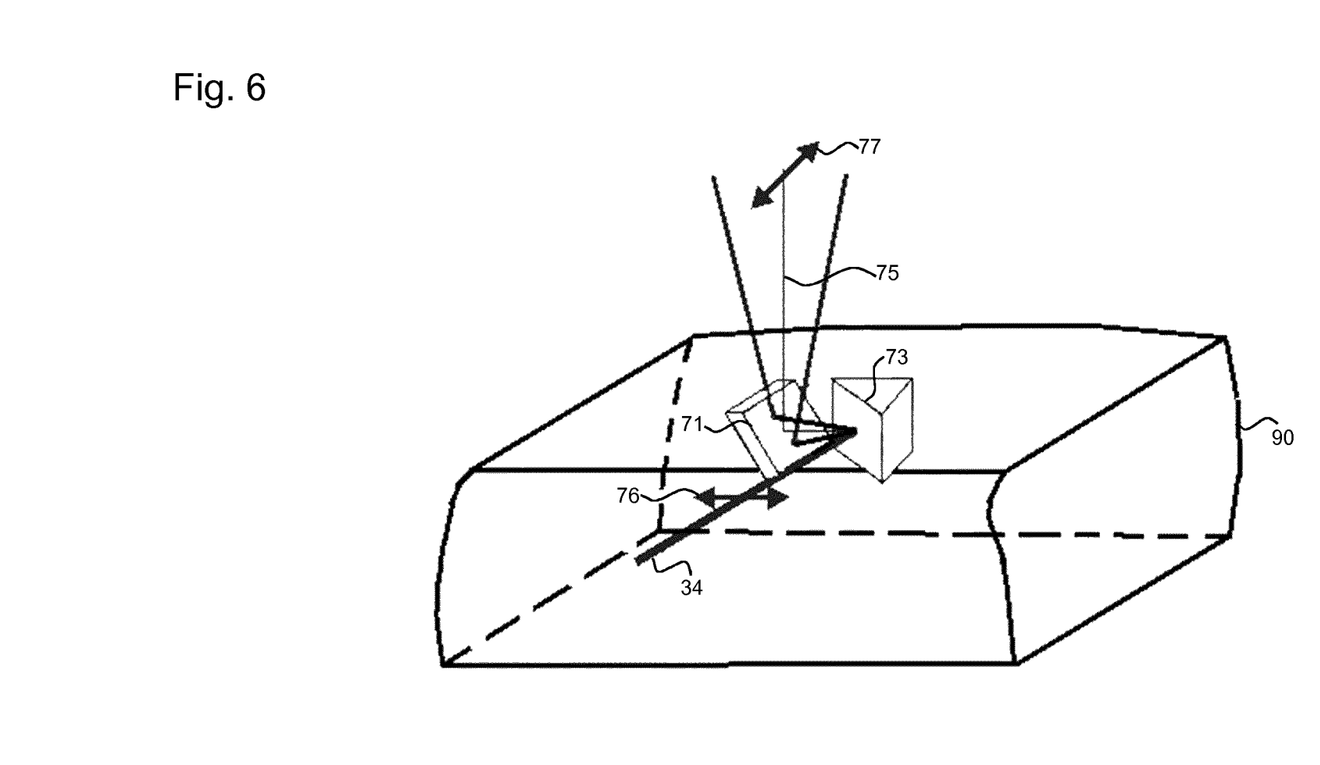
FIG. 6 schematically shows another exemplary design of a part of the optical assembly of FIG. 1 or 2.

Each path division may also lead to two consecutive mirrored interfaces before light exits the waveguide chip. Such an example is shown in FIG. 6, which schematically shows a perspective view of a part of a waveguide chip 90.

A path division 34 leads to two consecutive mirrored surfaces 73 and 71. These are arranged in the form of a periscope, also referred to as a micro-periscope. The first mirrored surface 73 redirects light from path division 34 within the waveguide chip and/or within the plane of the waveguide chip to the second mirrored surface 71. The second mirrored surface 71 redirects light into the exit direction 75 out of the waveguide chip 90. A polarization direction of light in the path division 34 and before the mirrored surfaces 71, 73 is indicated with arrow 76. As shown, this polarization direction may be in the plane of the waveguide chip. Reflection at the surfaces 73, 71 affects the polarization such that a polarization direction 77 of light having left the waveguide chip 90 is rotated, preferably by 90°.

In addition to the described light guide paths, a further light guide path may be provided which is not connected with one of the inputs 31, 41, 51 of the waveguide chip. The further light guide path may have an input coupled with a further light source, e.g., an LED connected to the waveguide chip at the input of the further light guide path. The further light guide path has an output located next to one of the inputs 31, 41, 51. For example, a distance between the output of the further light guide path and one of the inputs 31, 41, 51 may be smaller than five diameters of the (further) light guide path. In particular, a coupling-out direction of the output of the further light guide path may be parallel to a coupling-in direction of the inputs 31, 41, 51. This may be achieved in that the further light guide path is, in its end section to its output, parallel to the sections of the light guide paths 32, 42, 52 at their inputs 31, 41, 51. Light leaving the output of the further light guide path may be measured with a further light detector and/or used for beam adjustment or collimation adjustments.

The inventive design offers an improved stability and accuracy as the outputs of the waveguide chip and hence the spot patterns in the pupil plane have a predefined arrangement, and no optical components are necessary to direct light from the waveguide chip to a pupil plane which would need to be aligned or may suffer misalignment over time. In particular no optical fibers are necessary for this purpose, and hence coherence problems due to different lengths of optical fibers are avoided. As a consequence, less expensive lasers can be used as light sources. A particularly high accuracy is achieved with a setup requiring a comparatively low number of components.

A main advantage of the inventive light microscope resides in that many functions can be integrated in a single waveguide chip. This not only leads to space reductions but also avoids adjustment issues of individual movable components. For instance, optical fibers behind the waveguide chip become obsolete. Also phase shifters and/or polarization rotating means may be integrated in the waveguide chip; wherein the polarization rotating means may be formed by a mirror pairs in the shape of micro-periscopes or with a half-wave plate arranged at each of the outputs.

LIST OF REFERENCE SIGNS 1 light microscope
4 light source
5 light
6 mirrors for combining beam paths
7 AOTF
8 scanner
9, 16 reflecting surfaces of the movable deflector
10 dichroic beam splitter
11.1, 11.2, 11.3 optical fibers
15 Structured light exiting the waveguide chip
18 zoom assembly
19 objective
20 specimen plane
21 control unit
22 detector
23 lenses
24 dichroic beam splitter
25 output polarizing unit with half-wave plates
26 filters
27 movable deflector
28 camera
30, 40, 50 path divisions not used for illuminating a sample
31, 41, 51 inputs of the waveguide chip
32, 42, 52 light guide path
33, 43, 53 splitter formed in the waveguide chip
34, 35, 36; 44, 45, 46; 54, 55, 56 path divisions of the waveguide chip
37, 38, 39, 47, 48, 49, 57, 58, 59 outputs of the waveguide chip
61, 62, 63 additional inputs
64, 65, 66 additional light guide path
67, 68, 69 TIR output
70 substrate of the waveguide chip
71 interface for deflecting light out of the waveguide chip
72 recess provided in the substrate of the waveguide chip
73 interface for deflecting light within the waveguide chip
75 exit direction of light from the outputs
76 polarization direction of light within the waveguide chip
77 polarization direction of light coupled-out of the waveguide chip
81-89 light spots in a pupil plane
90 waveguide chip
95 optical assembly
96, 97 fast axes of the half-wave plates
P plane defined by the waveguide chip

The invention claimed is:

1. A light microscope comprising:
a structuring optical unit configured for providing a structured illumination from impinging light, the structuring optical unit comprising a waveguide chip with a plurality of inputs;
an input selection device configured for variably directing light to one of the inputs;
the waveguide chip further comprising a light guide path following each of the inputs wherein each light guide path divides into several path divisions; and each path division leads to one output of the waveguide chip;
wherein
an exit direction of light from the outputs is transverse to a plane defined by the waveguide chip,
the path divisions are formed such that at least some of the path divisions which belong to different inputs intersect, and the intersecting path divisions intersect each other at an angle between 70° and 120°.

2. The light microscope as defined in claim 1,
wherein
the light guide paths and the path divisions extend in or parallel to a pupil plane of the light microscope.

3. The light microscope as defined in claim 1,
wherein
each output of the waveguide chip comprises an interface for deflecting light out of the waveguide chip by total internal reflection.

4. The light microscope as defined in claim 1,
wherein
each output of the waveguide chip comprises an interface for deflecting light out of the waveguide chip, wherein the interface comprises a mirror.

5. The light microscope as defined in claim 3,
wherein
each interface is at an angle between 20° and 70° to the plane of the waveguide chip.

6. The light microscope as defined in claim 3,
wherein
the interface is formed by a recess in the waveguide chip.

7. The light microscope as defined in claim 1,
wherein
the outputs of the waveguide chip that belong to the same input form a dot pattern, and
the dot patterns are similar to each other but rotated relative to each other.

8. The light microscope as defined in claim 1,
further comprising an input polarizing unit which is configured to polarize light such that its polarizing direction is in the plane of the waveguide chip when impinging on the inputs of the waveguide chip.

9. The light microscope as defined in claim 1,
further comprising an output polarizing unit on which light from the outputs of the waveguide chip impinges,
the output polarizing unit being configured to rotate a polarization direction of impinging light by 90°.

10. The light microscope as defined in claim 1,
wherein
each output of the waveguide chip comprises two mirrors arranged at a substrate of the waveguide chip, the mirrors being configured such that they rotate a polarization direction of impinging light by 90°.

11. The light microscope as defined in claim 1, wherein
the waveguide chip comprises adjustable phase shifters at some or all of the path divisions, the phase shifters being configured for adjustably setting a phase shift of light in the respective path division.

12. The light microscope as defined in claim 1, wherein
for providing a TIR illumination, the waveguide chip comprises one or more additional inputs which each connect to an additional light guide path leading to a respective TIR output of the waveguide chip,
wherein the outputs of the waveguide chip define a geometric center, and
wherein each TIR output is further away from the geometric center than any of the outputs of the waveguide chip.

13. The light microscope as defined in claim 1, further comprising:
a zoom assembly arranged behind the outputs of the waveguide chip,
a control unit designed to receive a control command indicating whether a structured illumination is desired or a total internal reflection illumination is desired,
the control unit being designed to set a larger magnification with the zoom assembly if total internal reflection illumination is desired.

14. The light microscope as defined in claim 1, further comprising:
optical elements arranged between the waveguide chip and a specimen plane and configured to:
create a pupil plane at a location of the waveguide chip, wherein the outputs of the waveguide chip are arranged at the pupil plane, and
to produce in the specimen plane an interference pattern of the light exiting through the outputs of the waveguide chip, for providing a structured illumination in the specimen plane.

15. The light microscope as defined in claim 1, wherein
each light guide path is connected to a splitter formed in the waveguide chip which is configured to divide the light guide path into four parts,
wherein three of said parts constitute three path divisions, and one of said parts leads light away such that light of that part does not illuminate a sample.

16. A method for providing structured illumination light in a light microscope, the method comprises the steps of:
Guiding light from a light source to an input selection device;
Variably directing light with the input selection device to one of a plurality of inputs of a waveguide chip which is configured to provide structured illumination from incoming light;
the waveguide chip further comprising a light guide path following each of the inputs wherein each light guide path divides into several path divisions;
and each path division leads to one output of the waveguide chip;
wherein
light exits the outputs of the waveguide chip in an exit direction which is transverse to a plane defined by the waveguide chip,
the outputs of the waveguide chip that belong to the same input form a dot pattern, and
the dot patterns are similar to each other but rotated relative to each other.

17. The method as defined in claim 16, wherein:
the outputs of the waveguide chip are arranged at or in the region of a pupil plane of the light microscope.

18. The method as defined in claim 16, wherein
the path divisions are formed such that at least some of the path divisions which belong to different inputs intersect; and
the intersecting path divisions intersect each other at an angle between 70° and 120°.

19. The method as defined in claim 16,
for providing a TIR illumination, the waveguide chip comprises one or more additional inputs which each connect to an additional light guide path leading to a respective TIR output of the waveguide chip,
the outputs of the waveguide chip define a geometric center, and
each TIR output is further away from the geometric center than any of the outputs of the waveguide chip.

20. A light microscope comprising:
a structuring optical unit configured for providing a structured illumination from impinging light, the structuring optical unit comprising a waveguide chip with a plurality of inputs;
an input selection device configured for variably directing light to one of the inputs;
the waveguide chip further comprising a light guide path following each of the inputs wherein each light guide path divides into several path divisions; and each path division leads to one output of the waveguide chip;
wherein
an exit direction of light from the outputs is transverse to a plane defined by the waveguide chip,
for providing a TIR illumination, the waveguide chip comprises one or more additional inputs which each connect to an additional light guide path leading to a respective TIR output of the waveguide chip,
wherein the outputs of the waveguide chip define a geometric center, and
wherein each TIR output is further away from the geometric center than any of the outputs of the waveguide chip.

* * * * *